UNITED STATES PATENT OFFICE.

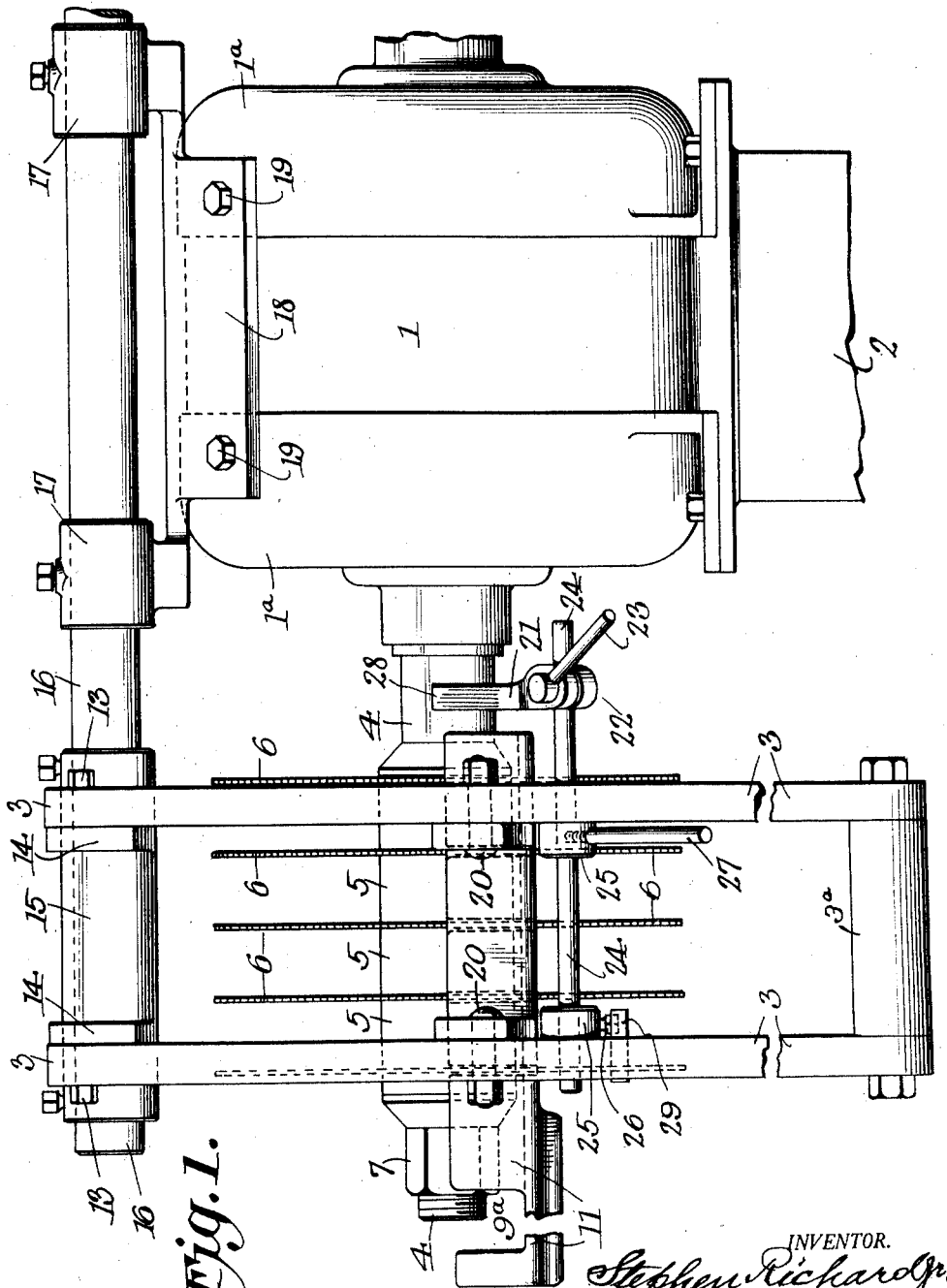

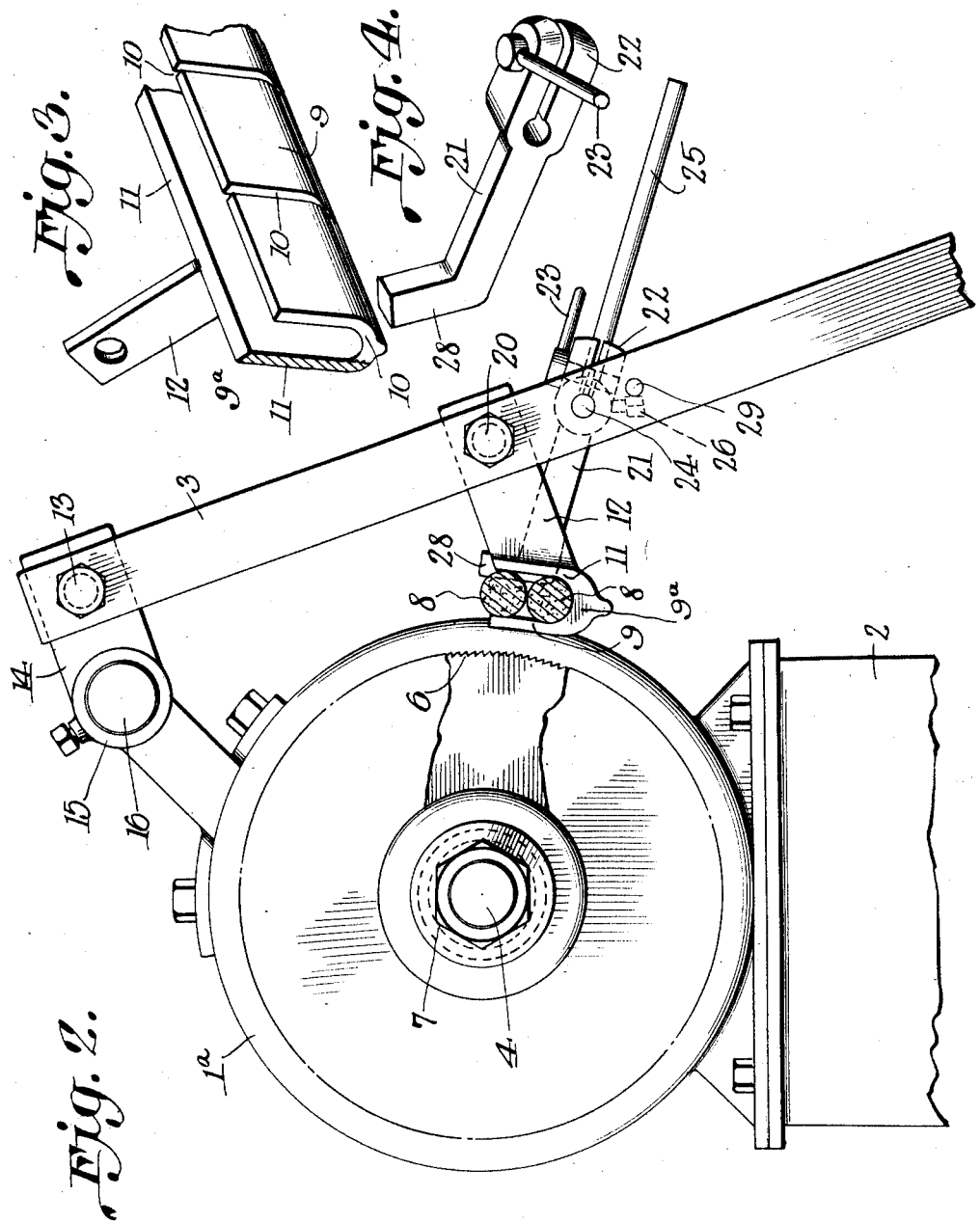

STEPHEN RICHARD, JR., OF WORCESTER, MASSACHUSETTS.

GANG-SAW MULTIPLE ROD-CUTTING MACHINE.

1,401,363.  Specification of Letters Patent.  Patented Dec. 27, 1921.

Application filed August 26, 1920. Serial No. 406,259.

*To all whom it may concern:*

Be it known that I, STEPHEN RICHARD, Jr., a citizen of the United States, residing at Worcester, in the county of Worcester and State of Massachusetts, have invented certain new and useful Improvements in Gang-Saw Multiple Rod-Cutting Machines, of which the following is a specification.

This invention relates to rotary machines for cutting rods, tubes and bars, and pertains especially to a machine for cutting rods of rubber or rubber composition into proper lengths or plugs commonly used for attaching electric head, tail and spot-lights on automobiles.

The object of the invention is to provide a plurality of circular saws spaced apart on a motor shaft according to the proper or desired length of the plugs so that many plugs may be produced simultaneously with one and the same operation of a gang of saws.

A further object of the invention is to provide a motor attachment for swinging the plug rods in a saw cutting operation, and to provide said swinging attachment with means for holding the rods during said operation, and to furnish said attachment with an adjustable stop or gage for limiting the inward or longitudinal feeding movement of the rods, and to permit successive ejection of the cut plugs.

Various other objects, advantages and improved results are attainable in the manufacture and practical application of the invention.

In the accompanying drawings forming part of this application:—

Figure 1 is a front view showing the rod holder partly broken away.

Fig. 2 is an end elevation partly broken away.

Fig. 3 is a detail perspective view of part of the rod holder.

Fig. 4 is a detail perspective view of the adjustable gage.

The same reference characters denote the same parts throughout the several views of the drawings.

In cutting plug lengths from rubber or composition rubber rods, it has been found that the usual cutters or cutting disks soon become disqualified by reason of coming in contact with foreign matter such as grit, metal and the like, it has also been found expeditious to employe a gang or plurality of disk saws, and it has also been found that great saving of time and reduction of operators with increased production of plugs may be accomplished by a predetermined relative fixture of the saws according to the proper length of the plugs to be cut; to feed the plug rods plurally to the saws through a holder spaced into sections corresponding with the desired length of the plugs; to afford means for limiting the lengthwise movement of the plug rods; and to utilize said means in such manner as to permit ejections or deposit of the cut plugs in succession as the rods are slid into position for successive cutting without interrupting the operation of the machine. Therefore, it is the purpose of this invention to furnish means and special coöperating devices to accomplish such improved results, as hereinbefore mentioned, in the production of these plugs.

In carrying out my invention, I employ an ordinary electric motor 1, mounted on a supporting stand or base 2 of sufficient height to permit swinging movement of manually operated levers 3, hereinafter again referred to. The motor shaft 4 has an arbor comprising a plurality of bushings 5 of equal thickness and having the disks or circular saws 6 clamped therebetween by means of a nut 7, so that the space between the saws is the same as the desired or required length of the several plugs, whereby a multiple of plugs are sawed from two rods as 8.

One of the essential features of my invention is the special rod holder and means for operating the same, whereby the rods are given swinging movement to the saws in a sawing operation and the sawed portions of the rods are ejected from the holder in a plurality of plugs as the uncut portion of the rods are slid into sawing position simultaneously with the ejection of the plugs without stopping the operation of the machine. Said holder consists of a U-shaped trough-like receptacle for a pair of rods in lengthwise position. The inner wall 9 of the holder 9ᵃ has a plurality of slots 10 spaced apart at equal distance and through which slots the saws are rotated. Said slots extend through the bottom of the holder to the lower end of the outer wall 11 of the holder so as to permit the saws to cut entirely through the rods as the holder is fed in a sawing operation, and said outer wall is provided with arms 12. The means for feeding the holder and then reversing the movement thereof so as to eject or dislodge the cut plugs therefrom, comprises the levers 3 pivoted at 13 to projections 14 of a sleeve 15 secured to a shaft 16 held in collars 17 of a hanger bracket 18 attached to the motor casing or frame 1ª, as at 19, so as to permit the hanger end of the shaft 16 to project over the saws parallel with the motor shaft. The projections 14 are such as to offset the swinging levers 3 from the saws. The holder arms 12 are secured to the levers 3 by bolts 20 so that the holder is fed into the saws and retracted by foot pressure on the connecting member 3ª of the levers 3.

The plug rods are deposited lengthwise in the holder preparatory to a sawing operation, and in order to permit the rods to be slid into proper sawing position and stopped there, and also to permit the cut plugs to be ejected from the inner end of the holder by said sliding feeding movement of the rods, I provide a gage or stop 21, its outer end having a clamping member 22 operated by a clamp lever 23 for adjustably securing the gage on a bar 24 extending through and working in the levers 3, and having collars 25, one of which is fixed to the bar 24 by a set bolt 26 and the other of which has a hand lever 27 set-screwing against the bar 24. The head 28 of the gage is adapted to extend over the inner end of the outer wall of the holder and into the path of lengthwise movement of the plug rods, and is clamped in adjusted position on the bar 24 so that the end of the rods abutting thereagainst will be cut in proper plug lengths, and said head 28 keeps the rods in proper lengthwise position in the holder until they are cut, whereupon the levers 3 are released and retracted, the bar 24 is turned by the lever 27 for lifting the gage head 28, the uncut portion of the plug rods is slid into sawing position, and such sliding movement pushes the cut plugs out of the inner end of the holder. The gage or stopping movement of the head 28 is limited to proper position for overlapping the inner end of the holder by means of a stop lug 29 on one of the levers 3, and the head of the bolt 26 which engages said lug.

Obviously the swinging levers carry the holder with the plug rods and the gage into sawing position, and after each sawing operation the movement of the levers 3 is reversed and the gage bar operated to release the cut plugs, whereupon the gage is replaced and the rod lengths take the place of the ejected plugs. The sleeve 15 may be adjusted on the shaft 16 to raise and lower the pivot end of the levers 3 as desired.

It will be seen that the holder may be reversed endwise and the gage stop placed upon the opposite end of its bar to that shown in Fig. 1, so that the plug rods, bars or tubes may be fed into the holder from either end thereof.

While I have shown a gang of five saws as cutting a pair of rods, these may be multiplied as desired, and the holder may have other saw slots to permit cutting of additional number of plugs. The length, depth and size of the holder may be increased so as to hold additional rods, tubes or other articles for cutting.

I do not wish to limit my invention to any particular size and material of the parts, nor to the application of the invention, but reserve the right to make such changes and variations in the manufacture, assembly and practical application of the parts as may not be inconsistent with the appended claims.

Having thus described my invention what I claim as new and desire to secure by Letters Patent is:—

1. In a machine of the type described, including a work-holder having predetermined spaced apart slots, means for suspending said work-holder in operative position, rotary toothed cutting means adapted to be received by said slots, a pair of manually actuated swinging levers arranged with respect to said rotary cutting means, means effecting connection between said swinging levers and said work-holder, means for actuating said rotary cutting means, means for controlling said work-holder from said levers, said swinging levers being provided with a gage coöperative with said work-holder, and means for controlling the positioning of said gage with respect to said work-holder and to form an abutment for the work therein during the sawing operation.

2. In a machine of the type described, including a work-holder having predetermined spaced apart slots, means for suspending said work-holder in operative position, rotary toothed cutting means adapted to be received by said slots, a pair of manually actuated swinging levers arranged with respect to said rotary cutting means, means effecting connection between said swinging levers and said work-holder, means for actuating said rotary cutting means, means for controlling said work-holder from said levers, a gage coöperative with said work-holder, means for controlling the positioning of and causing the gage to overlap one end of said work-holder and to form an abutment for the work during a sawing operation, including a stop-lug provided upon one of said levers and a bolt carried upon the other lever, said lug and bolt being adapted for co-action.

In witness whereof I hereunto set my hand in the presence of two witnesses.

STEPHEN RICHARD, Jr.

Witnesses:
WILLIAM P. FARRELL,
GEORGE C. PARKER.